United States Patent
Segan et al.

(10) Patent No.: US 7,054,928 B2
(45) Date of Patent: May 30, 2006

(54) SYSTEM FOR VIEWING CONTENT OVER A NETWORK AND METHOD THEREFOR

(75) Inventors: Marc H. Segan, New York, NY (US); Gene Lewin, West New York, NJ (US)

(73) Assignee: M.H. Segan Limited Partnership, Great Barrington, MA (US)

( * ) Notice: Subject to any disclaimer, the term of this patent is extended or adjusted under 35 U.S.C. 154(b) by 770 days.

(21) Appl. No.: 09/747,220

(22) Filed: Dec. 21, 2000

(65) Prior Publication Data

US 2002/0029252 A1    Mar. 7, 2002

Related U.S. Application Data

(60) Provisional application No. 60/173,034, filed on Dec. 23, 1999, provisional application No. 60/195,158, filed on Apr. 6, 2000, provisional application No. 60/220,341, filed on Jul. 24, 2000.

(51) Int. Cl.
*G06F 15/173* (2006.01)
*G06F 17/60* (2006.01)

(52) U.S. Cl. ............................ 709/225; 705/14; 705/26

(58) Field of Classification Search ................ 395/226; 705/1–45, 50–80; 709/205, 217–219, 227–231; 345/769
See application file for complete search history.

(56) References Cited

U.S. PATENT DOCUMENTS 5,710,887 A * 1/1998 Chelliah et al. .............. 705/26
5,828,843 A * 10/1998 Grimm et al. .............. 709/228

(Continued)

FOREIGN PATENT DOCUMENTS

EP    0 782 085 A1    7/1997

OTHER PUBLICATIONS

Jennifer Smith and Andrew Cowan, "The MUD Faq—Frequently Asked Questions: Basic Information about MUDs and MUDding", www.mudconnector.com, 1996-1999.*

(Continued)

*Primary Examiner*—William C. Vaughn, Jr.
*Assistant Examiner*—Arrienne M. Lezak
(74) *Attorney, Agent, or Firm*—Cohen, Pontani, Lieberman & Pavane

(57) ABSTRACT

A system and method for viewing content over the Internet wherein a user accesses a service provider server to view a character icon provided by the service provider to a user interface device. The user will select web site addresses of subscriber target sites where the user can access enhancement content for the character icon to provide functionality to the character icon such as for animating the character icon on the user device. Addresses for such web sites may be provided to the user based on a particular character icon selection which may, in and of itself, signify interests and/or demographic information of the user. Access to enhancement content will be provided by accessing authorization codes present at the target sites. In a preferred embodiment, only certain enhancement content will be operable on certain character icons, thus requiring the user to locate enhancement content that is compatible with the user's character icon.

16 Claims, 15 Drawing Sheets

U.S. PATENT DOCUMENTS

| | | | | |
|---|---|---|---|---|
| 5,880,731 A * | 3/1999 | Liles et al. | | 715/758 |
| 5,884,029 A * | 3/1999 | Brush et al. | | 709/202 |
| 5,907,328 A * | 5/1999 | Brush, II et al. | | 715/863 |
| 5,913,040 A | 6/1999 | Rakavy et al. | | |
| 5,940,078 A | 8/1999 | Nagarajayya et al. | | 345/346 |
| 5,963,208 A | 10/1999 | Dolan | | 345/357 |
| 5,991,740 A | 11/1999 | Messer | | |
| 5,995,102 A | 11/1999 | Rosen et al. | | |
| 6,025,844 A | 2/2000 | Parsons | | 345/357 |
| 6,433,784 B1 * | 8/2002 | Merrick et al. | | 345/473 |
| 6,476,830 B1 * | 11/2002 | Farmer et al. | | 715/769 |
| 2003/0050831 A1 * | 3/2003 | Klayh | | 705/14 |

OTHER PUBLICATIONS

"The MUD Faq", The MUD Connector, (previously submitted to Aplicant).*

"Write Design Online: MUDs and MOOs Resources", Jones and Darling.*

Darcy Dinucci et al. Elements of Web Design, 1998, pp. 122, 152-158.

International Search Report of PCT/USOO/35022 dated Mar. 28, 2001.

* cited by examiner

Bruno's Soup menu.

Bruno, about to acquire the two-step Soup.

Bruno, now two-stepping.

Bruno's soup menu, after acquiring the two-step Soup.

At books.com, Bruno points out that there's soup available.
Note the bookish background behind him, loaded at books.com.

Here's Bruno, using his "yo-yo" soup.

Soup can be an alternate outfit...

SYSTEM FOR VIEWING CONTENT OVER A NETWORK AND METHOD THEREFOR

CROSS-REFERENCES TO RELATED APPLICATIONS

This patent application is related to U.S. Provisional Patent Application Ser. No. 60/173,034 filed Dec. 23, 1999, Ser. No. 60/195,158 filed Apr. 6, 2000 and Ser. No. 60/220,341 filed Jul. 24, 2000 for System For Viewing Content Over A Network And Method Therefor, which applications are incorporated herein by this reference thereto.

BACKGROUND OF THE INVENTION

1. Field of the Invention

The present invention generally relates to techniques for exploring web sites over a global computer network (e.g., the Internet). More particularly, the present invention pertains to a system for employing an agent, character symbol, representation or icon for exploring web sites and for directing or providing users of the system with incentive to access certain sites.

2. Description of the Related Art

With the ever increasing span of the Internet, increased numbers of users access the Internet for various purposes. Such Internet use typically takes on three forms. The first is accessing specific web site addresses (e.g. URL's) by directly entering an address or selecting a desired address from a file of stored addresses (bookmarks). The second form is by searching, browsing or "surfing" the web to locate specific information sought or to simply view various content for entertainment, amusement or educational purposes. In the "surfing" context, numerous search engines are available to assist a user in locating the desired information. The third form is for interaction with other Internet users, such as by playing games, utilizing messaging services, chat rooms, etc., which provide for multiple Internet user interaction.

The Internet is also a relatively new source of advertising revenue, and marketing techniques are employed for directing or luring people to specific web sites to view products or services, or other information concerning the advertiser. In advertising through traditional forms of media, such as in print, radio or television, it is a primary goal to have the advertisement exposed to as many people as possible. In the Internet media this is accomplished by increasing the number of visitors or "hits" to a specific web site to maximize the number of visitors viewing the advertisement. Current marketing techniques to attempt to lure or attract users to specific sites are in the form of special offers available at a site, or in the form of banner advertisements which are located on the web pages and which, when accessed, typically provide a direct link to a web site operated under the authority of the banner advertisement sponsor or purchaser. The banner advertisement sponsor is typically not related to the web site owner on which the banner advertisement is displayed. By a visitor selecting a banner advertisement (e.g., by pointing and clicking with a mouse, etc.) the visitor is directed away from the host web page to a web page associated with the banner advertisement sponsor. This is a drawback to the owner of the host web page and can present a nuisance to the web page visitor. Moreover, due to the pervasive and widespread deployment of banner ads, such advertisements are typically ignored and, therefore, are ineffective.

Accordingly, it is an object of the present invention to provide an entertaining system and method of using the Internet to locate and acquire user enhancements or upgrades to a character symbol or icon as well as special offers or coupons incidental to the character icon, for use by the system user.

It is a further object of the invention to provide for a novel advertising technique to attract Internet users to advertiser web sites by offering desired user incentives such as enhancements or upgrades to a character icon.

It is still a further object of the invention to provide a novel educational, guiding and training system and method wherein character enhancements will be accessible upon navigating the Internet and locating information and/or correctly answering queries.

SUMMARY OF THE INVENTION

The present invention provides a unique system and method for directing network users to specific web sites and, particularly, for providing incentives to Internet users in an entertaining and/or educational format to encourage such users to visit, for a single time or repeatedly, third party or target web sites. This is generally accomplished by assigning a system user with a symbol or character icon which will be visible to a user on an operating device such as a computer, PDA, mobile phone or other Internet accessible device when a computer application or program is activated. The operating device provides a user node with connection to the Internet network and the computer application will be installed on or otherwise accessible by the user's operating device and used to control, operate and provide functionality to the character icon for, among other things, animating the icon. When the computer application is activated and the operating device is connected to the Internet, the user will be directed to or will be provided with Internet address locations of web sites of subscriber advertisers connected to the Internet via an advertiser server (e.g. target web sites addresses) where the user can access enhancement content that may pertain or relate to features, characteristics or attributes of the character icon. In this manner, additional icon functionality, attributes or other items such as electronic coupons, may be acquired by visiting various enhancement content-providing target web sites.

The enhancement content which can be provided by subscriber or target web sites or by the service provider can be in various forms, such as, applet programs, sound files, text, vector and/or bitmap graphics, etc. that provide certain functionality to a character icon when the enhancement is accessed. For example accessed content may provide the ability to animate an icon to perform a function, e.g., sing, dance, speak, etc., or to provide enhancements for generating, on the user's device, the appearance of a clothing article such as a hat, coat, or outfit, or other objects, e.g., hockey stick, walking cane, jewelry ring, etc. When a particular enhancement is selected, the character icon will be depicted on the operating device as wearing or using the enhancement item.

It is presently contemplated that at least some of the offered content will only be readily available to users on a conditional basis, such as by successfully answering a trivia question posed at the target web site or by locating and selecting (e.g., pointing and clicking with a mouse, etc.) a window or symbol or enhancement access code which is "hidden" at the target site. The posed questions may also change over time such that in the event a user cannot successfully answer a current question at a target site to access enhancement content, the user may return to that site at a later time when a different question will be posed in the hopes of then acquiring access to the enhancement content. In this manner, enhancements will be "earned" while a user is directed to specific content at a target site, thus adding a level of entertainment to a user of the present invention who is browsing the Internet, as well as creating a valuable marketing, informational and/or guidance and/or educational tool for the target site owner. Operation of the earned enhancements by running a program to have the character icon perform a function may also be further restricted such that activation will only be possible upon acquiring a complementary enhancement content which may be offered at the same content provider site or at a different site. This results in a user being directed to different sites and/or pages within a site to acquire the necessary enhancement content "pieces" to perform a function for an icon character.

In a most preferred embodiment, some of the enhancement content will only be available to certain character icons and will depend on certain icon characteristics. Thus, a user having a character icon resembling a baseball player will be provided access to an enhancement content pertaining to a baseball player character such as for generating on the user's device, the appearance of a baseball bat, baseball glove, or an audio sound byte pertaining to baseball which will not be available to other icon forms (e.g., an animal-shaped icon, etc.). This also allows for quality control of the available enhancements such that they can only be employed with certain icons. Such quality control feature is important considering the present contemplation of licensing certain well-known characters as icons.

To become an authorized user of the inventive system, registration with a system provider will be required. This is accomplished by a user accessing a system provider web site whereupon the user will be given the option of providing specific demographic data as well as preference and interest data, e.g. hobbies, interests, etc. The user will also be assigned or provided an opportunity to select a character icon for use with the system. Of course, certain character icons may suggest particular traits or demographic information of the selecting user, in which case specification of user preferences may not be required at all. For example, if a user selects a character icon commonly associated with a science fiction theme, the system may assume that the user is interested in science fiction and, thus, direct the user to sites for obtaining such appropriate content. On the other hand, if the selected character icon is from a children's game or television program, the system may assume that the user is a child having interests including the game or show from which the character pertains. The system will then direct the user to content appropriate for children pertaining to, for example, video games and/or children's television programs, etc.

A software operating program for communicating with the system provider site may be downloaded and installed on the user device. If a service fee is required, billing information (e.g. credit card information) will also be provided by the user to the system provider. Certain character icons may be stock icons while others may only be available for a an additional fee. Moreover, certain character icons may be available only for a limited time or in a limited quantity, thus adding to the appeal and desirability of acquiring so-called limited edition character icons.

In the preferred embodiment, target sites desirous of providing enhancement content for character icons in an effort to lure users to the target sites will also be required to register with the service provider, such as by paying a fee, etc. The service provider will then provide the target sites with the necessary coding to offer enhancement content that is compatible with the character icons. The service provider may then notify user subscribers of the web site addresses for the target subscribers such that the user subscribers can use the target addresses to locate and acquire available enhancements.

The notification may be performed as a general notification wherein all user subscribers are notified of the target web site addresses and/or on a selected basis based on, for example, the user subscriber's preferences (previously specified to the service provider) and/or on characteristics of the user's character icon. The notifications may also involve a description of the particular type of enhancement available. Such notification may be in the form of electronic communications provided to the user from the service provider site while the user's device is operating the system software. Preferably, however, target site addresses (URL's) will be forwarded or copied or otherwise provided to a specific file or location contained in a user file located on the service provider server which will be accessible when the user's device is operating the system software application. The target site addresses may also or alternatively be available through an electronic bulletin board listing, etc. which may be accessible via the service provider site and categorized based on each available character icon. A target site can then be accessed through a selection from the user file, or from a general enhancement content index file on the service provider server whereupon a web browser operating on the user's device will contact the selected target site in an attempt to locate enhancement content available at the selected site.

As explained above, the selection of a particular character icon, in itself, will signify or identify general information or preferences of a user such that separately-input user preferences will not be required. In this case, target site addresses pertaining to a character icon and/or to user preferences typically associated with a character icon will be provided to or otherwise locatable by a user of that character icon.

In another embodiment, the various enhancements made available at the target sites will be assigned an enhancement code which may be visible (in the form of an enhancement icon) to a user operating the operation software who is accessing the target site. If visible, the enhancement icon will allow the user to quickly identify the presence of an enhancement feature. In certain instances the enhancement icon may be an invisible code which becomes activated by a user performing an action such as moving a cursor over the invisible code, clicking at a location on a target web page, or by failing to perform an action for a predetermined time. The code may then perform various functions such as suddenly causing an enhancement icon to appear, or routing the browser to a "secret" or "hidden" URL to direct a user to a different web site, etc.

In yet a further embodiment, enhancements may be grouped by categories with a different icon per category. For example, an enhancement containing a "special offer" or coupon for the purchase of a product may have an icon resembling a document scroll whereas an enhancement providing a function such as facilitating movement or animation of a character icon may resemble a potion bottle or bowl of soup, etc. Alternatively, a standard enhancement icon can be used with a word or symbol to signify to a user the various enhancement categories. In either case, users may be able to visually distinguish between categories of enhancement content by the displayed codes or icons on the target sites.

The available enhancements content, once accessed or acquired by a user, may be downloaded from the target site to the service provider site whereupon access to the particular enhancement application or program will be provided to the user. In that manner, the need for occupying or utilizing excessive memory on the user's device will be avoided. Alternatively, the enhancement content may reside on the service provider server and, once a user accesses or acquires authorization for it, the enhancement content functionality will be provided to the user's character icon assuming, as explained below, that the enhancement content is compatible with the character. To perform a function or view a property of any of the acquired enhancements, a user will simply select a particular enhancement icon or item or word present on an enhancement menu on the user's device whereupon the application or program associated with the selected enhancement icon will be executed to perform the corresponding icon function, e.g. animating a character icon, etc. For subsequent use of the enhancement during a continued session (e.g., while the user is still connected to the service provider server, the application or program will preferably operate from cache memory in the user device. In addition, multiple enhancements can be accessed to appear or function simultaneously with each other such as, for example, a character icon singing a song while performing a dance (via a second enhancement).

In still another preferred embodiment, a user can acquire multiple character icons under one or more user accounts with the service provider whereupon multiple enhancement files, e.g., one enhancement file corresponding to each character icon, etc., will be formed in the user's account with different enhancements corresponding to the different character icons.

In yet another embodiment, character icons and enhancements therefor may be capable of being transferred from one user to another. Such a feature may produce a collecting hobby or market among various icon character users.

Another feature of the invention will provide for multiple users of the system to interact through their respective character icons at an intermediate location such as in a "chat" room to allow for users to view character icons and their corresponding enhancements from different users and to interact, such as in trading character icons, and/or enhancements as well as simulating a fighting game or other contest of skill by employing the acquired enhancements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWINGS

In the drawings wherein like reference characters denote similar elements throughout the several views.

DETAILED DESCRIPTION OF THE PRESENTLY PREFERRED EMBODIMENTS

The present invention is directed to an entertaining network browsing system and technique wherein a user selects or is assigned a representative or character icon which the user will deploy while searching or browsing a network such as the Internet. Essentially, a user's character icon is employed by the user or "owner" to browse various web sites on the network to locate and access content. The content may be designed for or tailored to specific character icons or pertain to specified user preferences that may or may not be generally associated with users selecting a particular character icon. The appropriate content will be made available by web site operators or target sites to attract or lure character icon users to such sites, thereby increasing the traffic at such web sites.

Figure 1:
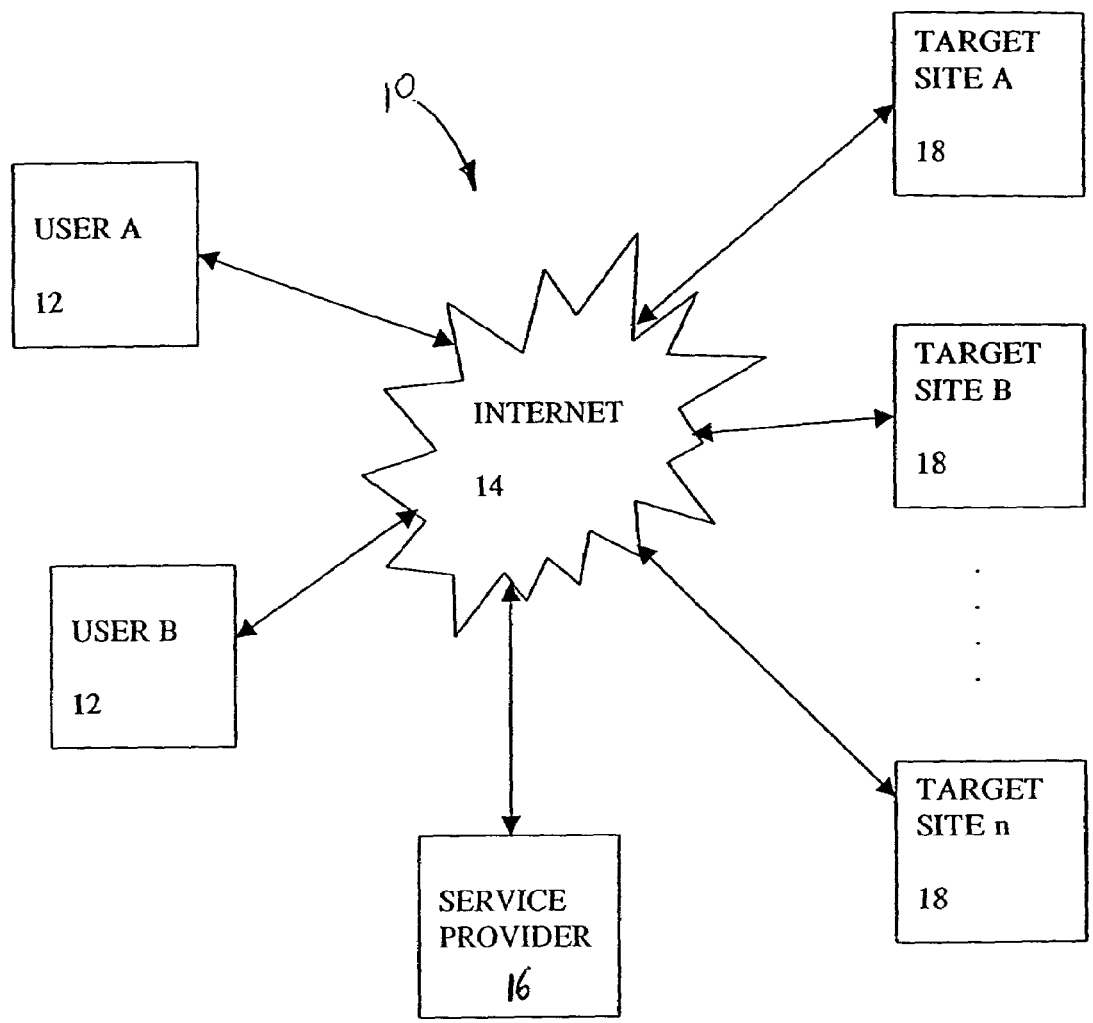
FIG. 1 is a block diagram generally depicting a preferred embodiment of the inventive system.

With reference to FIG. 1, an illustrative embodiment of an inventive system 10 in accordance with a presently preferred embodiment depicts multiple user devices 12 each having an associated browser program for establishing a user node or connection with a network 14 such as the Internet in a manner well known to those having ordinary skill in the art. The user devices 12, as explained above, may include any type of Internet-accessible device. For simplicity, however, the device 12 will be referred to herein as a PC operating an Internet browser. Also, although only two user devices 12 corresponding to a user A and a user B are shown, it will be appreciated that numerous users can simultaneously subscribe to and use the system. The system 10 also includes multiple subscriber target sites 18 such as advertiser sites offering advertising content which are connected, via respective advertiser servers to the network 14 for establishing advertiser nodes. The user devices 12 and target sites 18 are in communication with a service provider server 16 via the Internet in a known manner. The target sites 18 are typically third party commercial web sites offering content and seeking to lure subscribers of the service provider (i.e., system users 12) to their respective sites, as discussed below. Again, although only three target sites 18 are shown, it will be recognized that numerous sites can readily participate in the inventive system 10.

To obtain a character icon a user will be required to visit an authorized web site or service provider site, such as by accessing an appropriate URL and registering with the remotely located service provider server 16. The user will establish an account with the server, such as by submitting a registration form (e.g., an electronically submitted HTML form) which is accessed through the browser operable on the user's terminal device 12. The terminal device may be a PC, laptop computer, PDA, mobile phone or other Internet accessible device. Minimally, a user's system name or "handle" and password are required. The handle should be unique across the system 10. The registration process may optionally require the user to answer specific questions pertaining to a user's interests such that the system can direct a user to specific target sites 18 or recommend that a user visit specific sites based on such interests. Alternatively, and as explained above, the selection of a character icon may, in itself, suggest particular interests of the user. Once registered, the user may select an image or character or icon from a list of available character icons, which will be displayed on the user's device when the user's device is connected to the service provider server.

After establishing an account, the new user may be required to install on its Internet device (e.g., computer) a local application controller or operating software containing the proprietary communication protocol which will facilitate in providing a user with access to and communication with the service provider 16. The operating software is preferably small enough to download quickly on a lowest common denominator PC system and is preferably installable on Windows-based systems. It will be recognized by those possessing ordinary skill that "non-windows" systems can also be used. Alternatively, the operating software can be made available through third party download sites, or pre-installed on new computers or other Internet accessible appliances such as by providing the manufacturers of such appliances with the necessary communication protocol to communicate with the service provider server. If the software is downloaded from an Internet accessed site (e.g., the service provider site 16, etc.), the software will then be installed on the user device in a manner well-known to those having ordinary skill in the art and will provide a graphical user interface (GUI) on the user's device. The application software may be, alternatively, made available in a fixed form such as on a CD, diskette, or other medium. At any time, a user may return to a system sign-up web site (e.g. the service provider server web page) to select additional character icons, such as by forming sub-accounts, in the same manner as explained above.

Figure 2A:
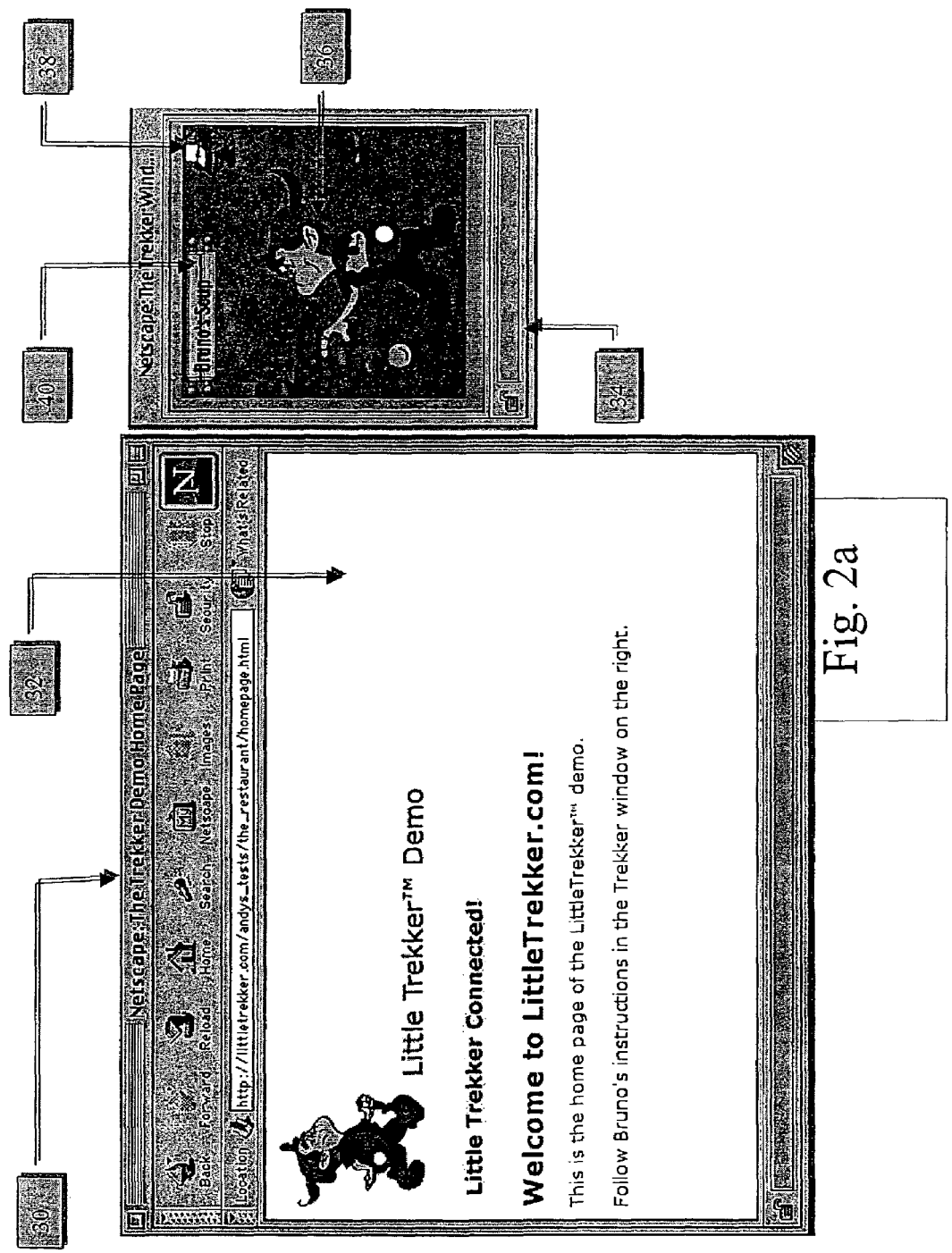
FIGS. 2a–2k illustrate various user interface screens depicting features of the present invention.

Once an account is established, the GUI may appear as screen 30 shown in FIG. 2a such that a user's device screen is divided into a browser window 32 and a character icon window 34. The browser window 32 will contain content provided from a visited web site, such as the service provider site 16 or a target site 18. After connecting to the service provider server 16, for example, a greeting message may appear in the browser window 32 for prompting a user to perform a function. The character icon window 34 will depict or illustrate character icon control, e.g., character icon animation, in a manner discussed more fully below. As shown, the character icon window 34 depicts a presently accessed character icon 36, shown in this example as an elf, and also contains an index icon 38 and an enhancement menu icon 40. It should be understood that although the GUI is shown in the figures as operating in two separate windows, it could, alternatively, operate in a single window or in multiple windows, as will be readily apparent to those of ordinary skill.

After registration, a unique identifier such as a "cookie" can be saved on the user's computer or accessing device that specifies the user's handle. Cookies are one of the few accepted means of storing permanent data on a user's Internet accessible device. Using this cookie, participating web sites or target sites can access a user's account record at the service provider site 16 to notify the user through electronic communication either directly or by communication with the service provider server of desired content available at the target site which may pertain to the user's specified preferences or to features or attributes of a particular user character icon.

Registration will establish a file or user record at the remote server home site. The user record will store information that can be functionally organized into two major areas. The first will contain the user's preferences specified for a particular character icon. Such data will include the interests specified by the user, such as when the user completes a questionnaire during the registration process, as well as the user's personal information (name, address, age). The data may also be tailored to different user interests and may correspond to different character icons. For example, a user may establish a first sub-account with a character icon and specify a first group of interests or preferences, and a second sub-account with a second character icon and a second list of preferences. Alternatively, and as previously mentioned, the character icon may identify interests of the user without the need for specifying additional preferences. In any event the user preferences (whether inherent or associated with a character icon or specified by a user) may be used to select web sites from a list or index or directory of target sites displayed at the service provider home site or at a different site based on the user's interests. The selection of sites will be in the form of a list or index and may preferably resemble or be organized in a similar manner as an address or phone book or directory such as by grouping the types of target sites offering enhancement content by category, etc. The target sites will offer information or character enhancement content or access to enhancement content related to a particular feature or characteristic of a user's character icon or to a particular user-specified preference.

Illustratively, a user may be interested in acquiring fishing-theme enhancements for one character icon, and baseball-theme enhancements for another character icon. In addition to a general target site index presented on the service provider site, each character icon user record contained on the service provider site will also contain data, e.g., program files, instructions, etc., corresponding to character icon enhancements (explained more fully below) acquired by a user through the visiting of various target sites. This obviates the need for a user's device to permanently store program applications (e.g., applets,) for executing the acquired character enhancement content.

As explained above, an alternative to directing users to target sites based on user specified preferences, the selection of a character icon itself may correspond to or reflect or suggest specific interest information or demographic information of a user of that character. As an example, if a character icon resembling a cooking chef is selected, the system will automatically assume that the user has an interest in, for example, food, cooking, kitchen products, etc., i.e. topics and/or goods associated with a chef. The system will then provide addresses of or provide a user with the ability to locate sites for information and enhancements pertaining to these topics. If, on the other hand, the selected character icon is one typically associated with a children's game or television show, the system will provide addresses of or the ability to locate sites for such related topics and/or sites offering content appropriate for children, etc. In this manner users will be provided with addresses or will be able to locate target sites based on character icon identity and based on typical user affinity of character icons.

Figure 2B:
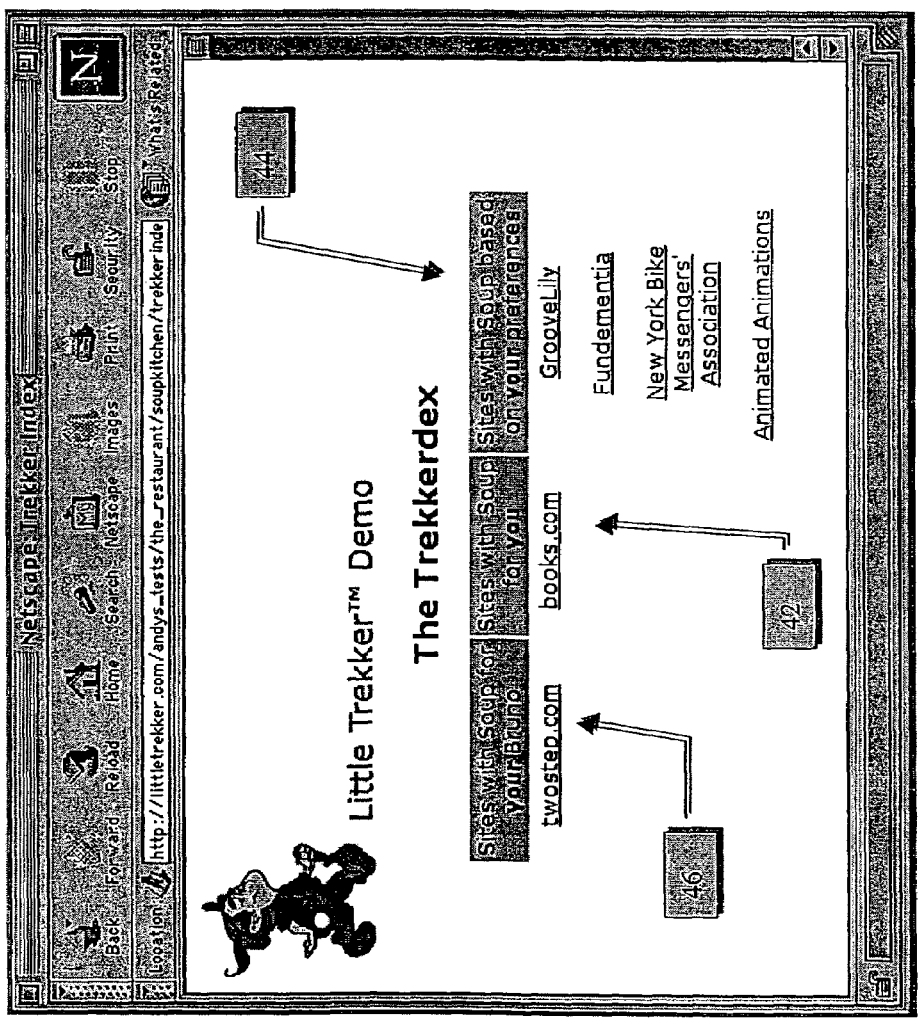
Figure 2C:
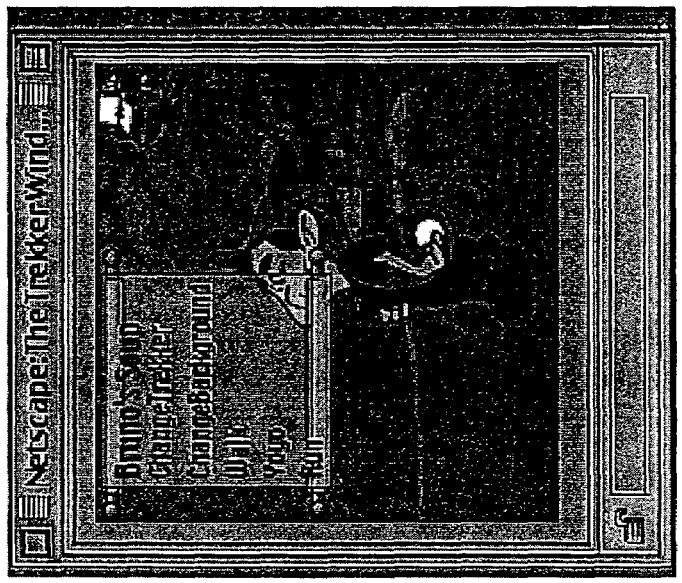

A view of the browser window 32 containing a target site index is depicted in FIG. 2b. As shown, the addresses of target sites offering enhancements to a user are listed in the index. The addresses may be grouped into three categories; a general category 42 containing target sites offering enhancements pertaining to all system users, a user preference category 44 which lists target sites that pertain to a user's preferences as specified to the service provider upon registration, and a character icon preference category 46 containing target site addresses related to a particular character icon presently activated by the user. The segregation of the target site addresses will be performed by the service provider based on the user's preferences (e.g., for the user preference category 44) and based on certain coding pertaining to the presently-activated character icon (e.g., for the character icon category 46). Thus, as shown in FIG. 2b, the elf character icon, also referred to as "Bruno" is presently activated and a target site address www.two-step.com having a Bruno-specific enhancement is listed in the character icon category index 46. FIG. 2c shows a list of presently-acquired Bruno enhancements which is displayed upon selection of the enhancement icon contained in the character icon window 34. As shown, the present enhancements are "Walk", "Run", and "Yoyo". There are also additional entries, namely "Changebackground" and "Changecharacter", which allow a user to select a different available background and icon, respectively, from the user's server file for display on the character icon window 34.

Figure 2D:
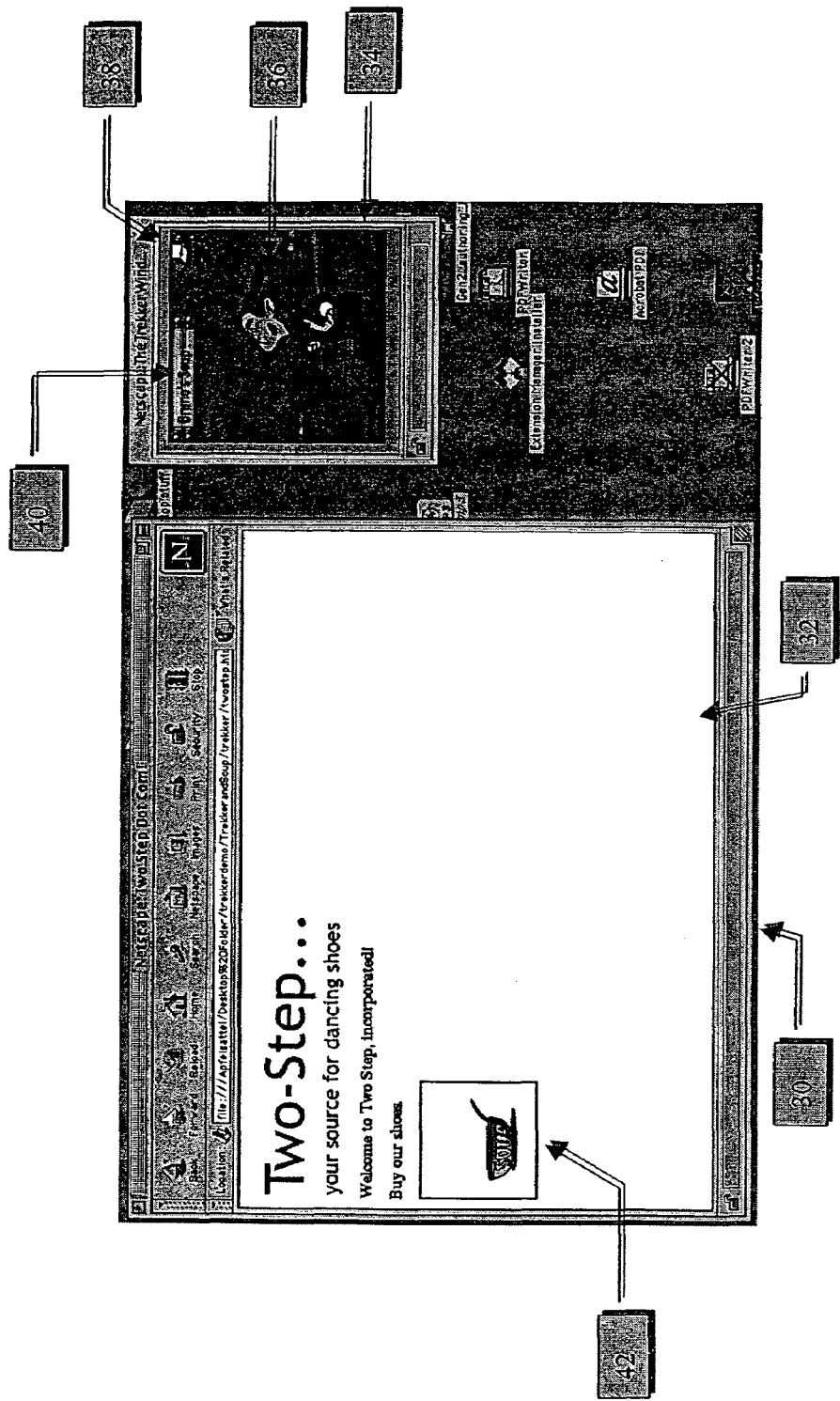
Figure 2E:
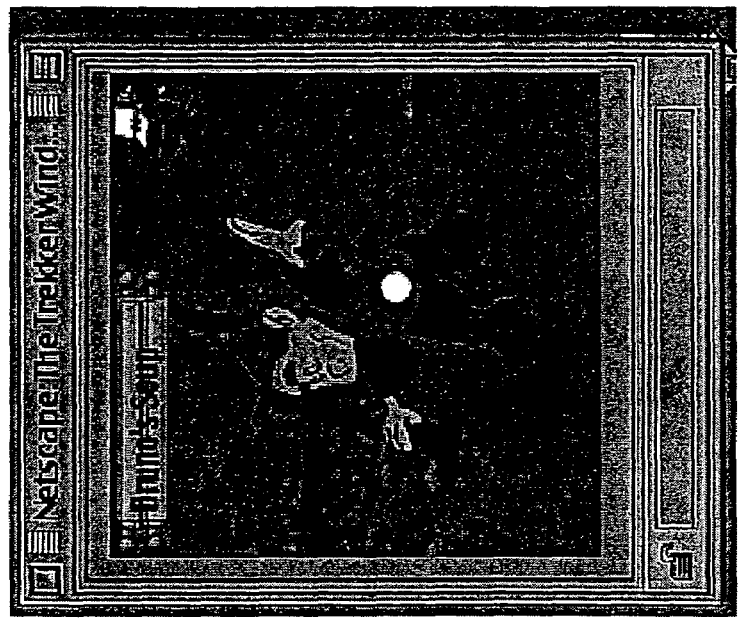

From the index of FIG. 2b the user can select a particular target site to access the desired link, such as by pointing and clicking via use of a mouse. For example, if the character icon target site (two-step.com) is selected, the user's browser window 32 will display the target site page as shown in FIG. 2d. Upon access, one or more available enhancement icons 42 will appear on the browser window. The enhancement icon 42 shown in FIG. 2d resembles, for example, a soup bowl. By clicking on the enhancement icon, the enhancement content program or coding will be forwarded from the target site to the service provider server 16 via the Internet and will be accessible to the user through the user's file maintained on the service provider server. Alternatively, the enhancement content may already exist on the service provider server and, upon a user accessing the enhancement icon 42, an authorization instruction is provided to the service provider server, again via the Internet, to allow the enhancement program to be used by the user's character icon. As shown in FIG. 2e, the selected enhancement access code or icon contained a program that provides animation to the character icon to perform a dance. It should be noted that when a target site is accessed by a browser program and the user is not, at that time, connected to the service provider server 16, the enhancement icons 42 will preferably not be detectable by the user's browser programs and, hence, will not be viewable by the user.

Figure 2F:
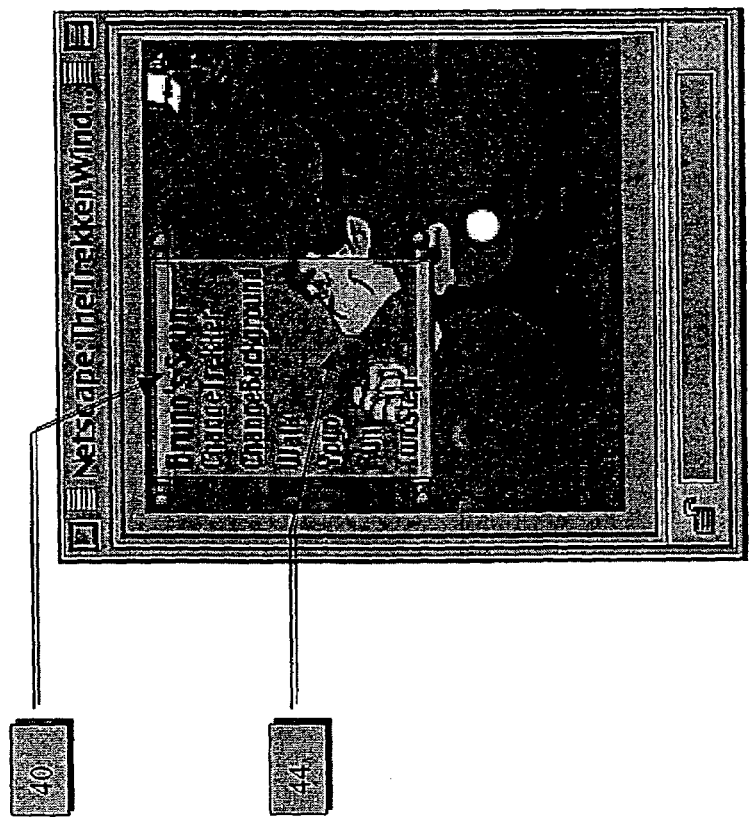

After the enhancement icon is selected and accepted by the user, the newly acquired enhancement is added to an enhancement menu 44, shown in FIG. 2f as "TwoStep", which is displayed upon selection of the enhancement menu icon 40. Also, once acquired, the target site address may be removed from the target site index shown in FIG. 2b. It is pointed out, that unlike an accessed banner advertisements which directs a user away from a host site containing the banner ad, after access of the enhancement icon at a particular target site, the user's browser program is not directed to a different site but remains at the target site. This allows the target site content to still be viewed by the user.

It is also pointed out that the system 10 provides a form of network advertising wherein advertisements do not occupy a significant, or any, portion of a hosting web site page on which the advertisement is accessed. Particularly, enhancement access icons or codes may only be visible to a user when the user is logged onto the system and, even then, will only be visible if an appropriate character icon is selected. Moreover, certain enhancement access codes will be intended to be invisible to a user to add an entertainment value or feature, e.g., by requiring a user to ascertain where an enhancement code may be located.

After acquiring an enhancement, the user can select the enhancement for causing the enhancement function to operate the character icon, e.g., to make the character icon "dance" as shown in FIG. 2e. This is employed by activating the enhancement program at the service provider server to control the user character icon through communication between the service provider server and the user device. If after initial access, the enhancement is subsequently accessed during the same service provider "session" with the user device, the enhancement program will preferably operate from cache memory in the user device, in a manner well known to those having ordinary skill in the art.

Figure 2G:
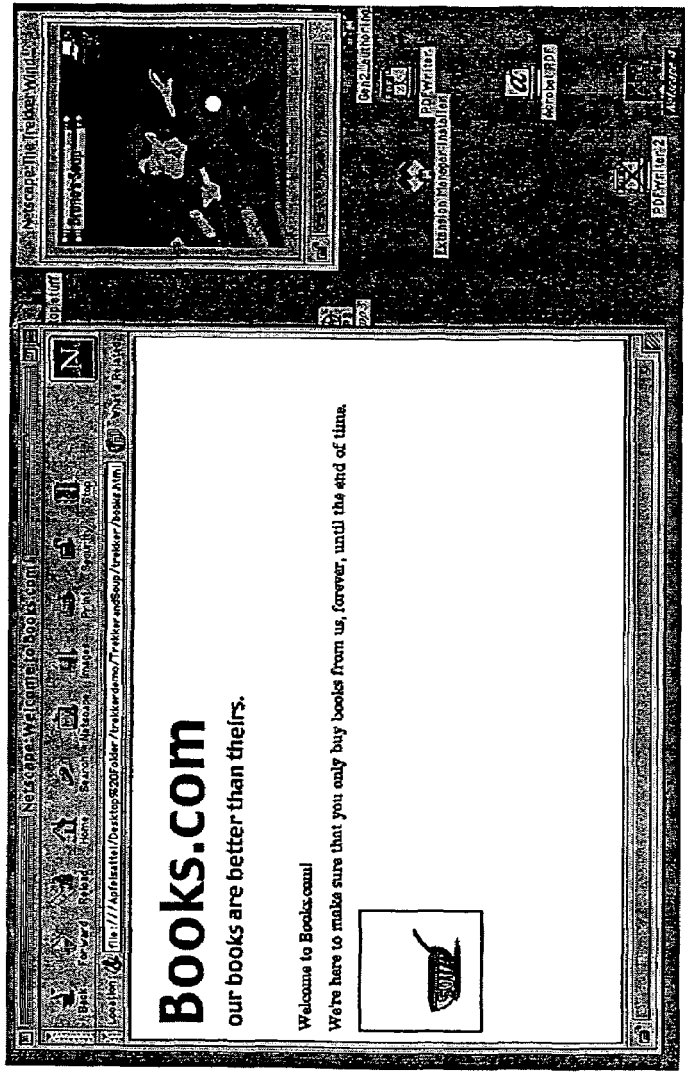
Figure 2H:
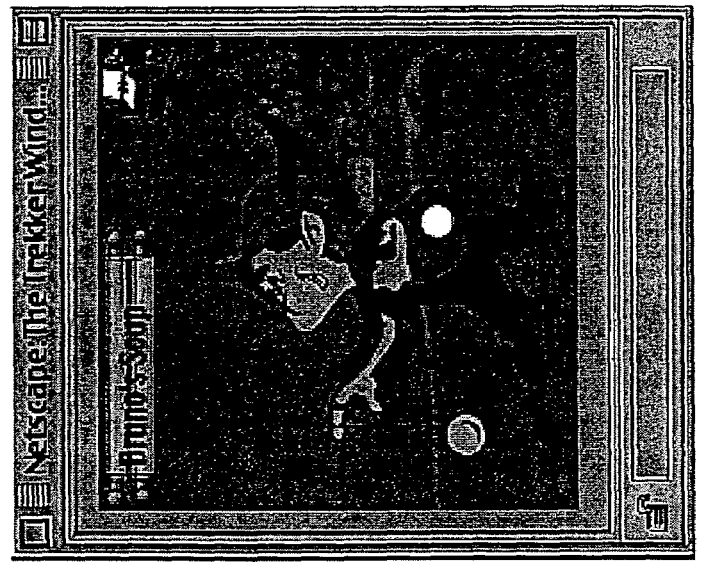
Figure 2I:
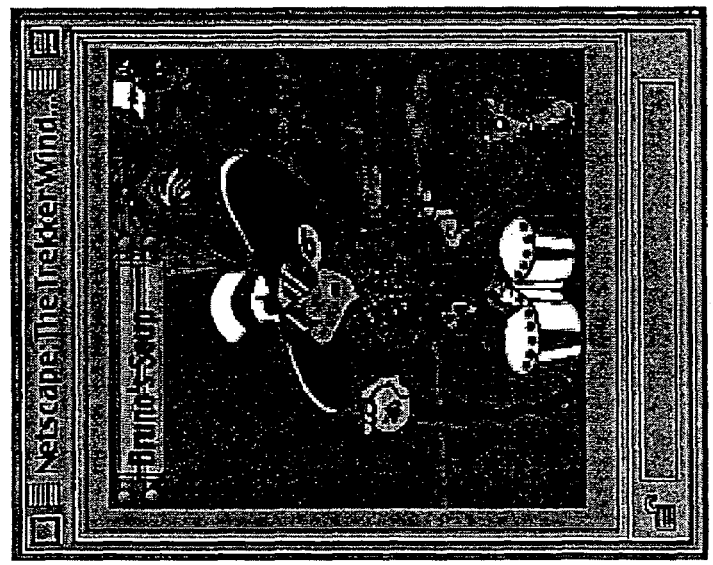

FIG. 2g shows the selection of an additional enhancement such as one offered at a target site "books.com". This enhancement may be, for example, an electronic coupon which can be used to obtain a discount, etc., from on-line purchases made at the books.com web site. FIG. 2h depicts the elf icon utilizing a different enhancement, namely, the operation of a yo yo, and FIG. 2i depicts the elf character icon simultaneously using multiple acquired enhancements, namely, a clothing outfit, a dog on a leash, a ring, and a walking stick.

Figure 2J:
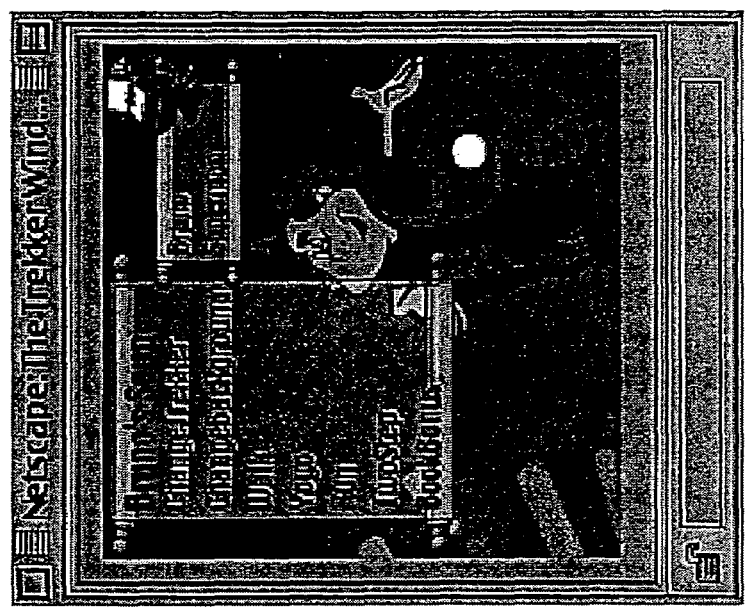
Figure 2K:

As shown in FIGS. 2j and 2k, access of the "changecharacter" command on the enhancement menu displays the user's available character icons, namely, "Bruno" and "Superman". From this character icon menu, the user can select a different icon, e.g., Superman, which will then be displayed in the character icon window 34, as shown in FIG. 2k, along with a corresponding enhancement icon containing the acquired enhancements for the now-selected character. Moreover, the target index icon will now display, along with general target sites offering general enhancements, enhancements tailored to the newly-selected character.

It should be appreciated that various other types of enhancements can be deployed for access by a user while visiting target sites. As an example, a series of enhancements may be represented by a common enhancement icon and, depending on the presently implemented character icon in use when a user selects the enhancement, a different corresponding enhancement function will be accessed. Such variations in enhancement functionality can also be implemented by establishing conditions or requirements such that a "beginner" character icon accessing an enhancement icon will be provided access to one type of enhancement and a "experienced" character icon (explained more fully below) accessing the same enhancement icon will be provided with a different enhancement function.

The enhancements may also consist of a series of sound bytes that are accessed as a user navigates various pages of a target site or various target sites. In this manner, the character icon can function as or simulate a "guide" of the target sites so that it will "speak" to the user as certain target sites are accessed.

Also, the enhancements may serve a navigational function wherein the enhancement coding or program will direct a user accessing the enhancement to a different web site address or location other than the target site containing the enhancement access code. This so-called "click-through" feature will result in the user's browser program being routed to a "hidden" or "secret" URL where additional enhancements may be found. This navigational function may be further modified to depend on the user's specified preferences or character icon experience level, such that a first user (user A) accessing a navigational enhancement may be directed to a first "hidden" location based on user A's preferences or on user A's then-implemented character icon identity, and a second user (user B) accessing the same navigational enhancement code may be directed to a second "hidden" location based on user B's preferences or on an identity of a then-implemented character icon of user B.

In another embodiment, character icons may depict a certain characteristic such as an experience level or "age", etc., by configuring a character icon in a manner that is different than the manner in which character icons having lesser traits are illustrated. This may make so-called "senior"

character icons more desirable for trading. For example, if all beginner character icons have a common appearance or attribute, as a user accumulates enhancements the character icon may be provided with additional and limited enhancements at the service provider site or a target site such as a stripe, badge, shoes, etc., having a particular color or other attribute. If a stripe is provided for example, the stripe color may signify the actions taken to achieve the stripe, such as accruing a certain amount of enhancements or points or answering trivia questions posted on a target site, as explained below. As a user's skill level increases, a second stripe may be accessible to signify a still-further skill level within a class. When a maximum point level or maximum amount of enhancements or certain specific enhancements are obtained, the user may be provided with an opportunity to acquire a special or limited-edition character icon which will further distinguish it from lower-level or beginner character icon. The limited-edition character icon can then achieve status symbols as well, such as stripes, in a manner as discussed above. Moreover, certain character enhancements may be configured to be only accessible by so-called experienced or upper-level character icons, thus providing user incentives to access an increased number of target sites to obtain an elevated status.

The limited-edition character icon may become desirable among other users due to their limited availability. In addition, such character icons can be capable of being traded, transferred or assigned to other users. This may be accomplished in various manners, as is known in the art. Preferably, an interactive page will be available on the service provider site where multiple character icon users can "meet" such as in a chat room or the like.

For example, a first user (e.g., user A) wishing to demonstrate to another user (e.g., user B) the execution of a particular acquired enhancement, may inform user B (such as by E-mail or other form of communication) to meet at a designated Internet site. Such so-called "display" or "trading" locations may be made available at the service provider site or through service provider authorization at other sites. Once at the display location, user A will be given an option to display a selected character icon and its acquired enhancement icons to other users at the display site. The character icon, however, will still remain under the control of its associated user. The particular character icons can then be instructed, e.g., by user A, to perform the various acquired enhancements, which will be displayed on the other visitors' computers that are "present" at the display location. The opposite scenario can also occur wherein user A will be capable of viewing the character icons and enhancements obtained and operated by user B, etc. Such interaction can also be used to simulate a battle, fight or other contest wherein acquired enhancements (e.g., a suit of armor, weapon, super power, etc.,) of a character icon of user A can be used to "fight" a character icon of user B present at a common site such as to force or cause user B's character icon to lose a previously acquired enhancement, i.e. the ability to further access the enhancement. During such a fight, the actions user A has his character perform (such as "kick", "punch" etc.) might effect user B's character by modifying one or more of user B's character enhancements. For example, if user B has previously acquired a shield for his character, and user A exercises enough well placed blows of his sword, then user B's character might lose his shield, or it might become dented. Further, the users can specify at the outset of their fight is they want the enhancements or attributes to be temporary (only showing during the fight) or permanent (once user B's character loses his shield, the enhancement functionality is no longer available to user B unless user B re-acquires it.

The acquired character icon and enhancements can also be used to participate in a video game offered at a target site wherein the character icon will appear as a participant in the game with enhancements used to provide functionality to the character in the context of the game. For this feature, a relationship could be struck between the service provider and a creator of a pre-existing computer game, online or offline, so that a pre-existing computer game-oriented character could be used as a character icon in the system 10. Then, as the user collects enhancements for the character icons, the enhancements would be useable in the playing of the game at the game creator's site. Similarly, if a user were able to play a particular computer game on the user's device, the arrangement, e.g., by licensing with the game creator, etc., will allow a specific game-licensed character icon to gather game-specific enhancements which will only be useable by the character icon when the character icon is used in playing of the game.

In another embodiment the system 10 will allow multiple users present at a display site to trade or exchange character icons and associated enhancements. This may be accomplished by generating a "trade" button icon on each user's browser window 32 and prompting each user to select the button if a trade is acceptable. In some instances more than one character or an amount of acquired points along with a character will be sought for trading for a more valuable or experienced character/enhancement user file. After selection, the service provider server will execute a script that will transfer ownership of user A's character icon and associated enhancements, to user B's file, and/or vice versa.

It should be apparent that the ability to acquire points and/or enhancements as so-called "rewards" for successfully completing a task (e.g., correctly answering a question, etc.) has value in an educational context. For example, students may be requested to locate facts or answer questions on a particular homework topic by accessing suggested target sites, which may be established for this purpose, and selecting correct answers to posed queries. This adds an entertainment value to learning and results in a valuable educational tool.

The target sites may also or alternatively provide links to non-enabled or non-target sites, i.e. sites that are not specifically coded for interaction with the System 10. A non-enabled site may be reached by clicking on a link at an enabled site. This link can contain the coding necessary to inform the system 10 of the destination site (i.e. the URL of the non-enabled site). For example, the enabled site might be a school's 4th grade history class site containing links to other sites that the students are to visit to locate answers to a homework assignment. In the event one of the target sites is a non-system enabled site, when the student clicks on the non-enabled site link (e.g. site X), the character icon will be simulated on the user's device to speak to the student such as "Aha! Good Choice! Hopefully you'll find the answer at site X".

The operating software running on the user's computer that displays the character-icon and enhancement content could be further modified to monitor the current URL in the browser window. When the user browses to a URL that the system knows about, the character-icon could react. Each character icon could have a list kept on the service provider's server of sites for which it should respond, as well as the corresponding response (what sounds to play, animations to show, etc.).

As should be apparent, the inventive system provides a unique manner in which characters icons can be used to access participating target web sites and acquire enhancements for the character which are offered by or available via access to the participating sites. Participating target web sites desirous of attracting character icon users will also register with the service provider to become authorized content providers of the system. In order to seek approval, registration may require, among other things, the target site to provide a description of the type of content offered at the site. Once approval is provided, the target site will obtain or have access to specific application software such as coding from the proprietary communication protocol used to implement the inventive system, which will identify such target sites to system users to facilitate access to the target sites by such users. Alternatively, the coding may be automatically installed by the service provider upon target site approval. The participating or subscriber target sites, upon registering with the service provider, can be provided with code fragments to access the system cookies stored locally on the users' computers or the user's character icon record or file located on the service provider server. This will provide the target sites with access to the users' handles. It is presently preferred that such access can also include access, if the user has previously granted permission thereto, to the user preference files in the service provider server so that users can receive notifications through the service provider server of information and enhancements available at the target sites corresponding to the particular users' character icons.

In the preferred embodiment, all character icon content such as enhancement content will be conveyed to a user through a readily accessible multi-media software application. A presently preferred application for this purpose is the "Flash Player" offered by Macromedia, although other applications can be used as will be known by those having ordinary skill in the art. Character and enhancement data will have extremely modest bandwidth requirements and such data will, preferably, be in text format. The software that is supplied from the service provider to participating target web sites will interpret this data and display it to the user on the user's device. For example, an enhancement software file might contain commands like "wave left hand", "walk", "sing a song", "change clothes", etc., which when activated, will operate and cause an action to occur on the user's device by the character icon. The target sites will embed a Flash movie provided by the service provider site in the HTML for the target web site pages. When the movie is run, it will load and interpret the user's character icon and character enhancement data and display the results.

All communication of character icon data between the home site and the participating target web site will be processed by the Flash movie. The movie will also include all necessary security, as is known in the art, to ensure that only participating web sites can access the service provider database containing the user preference information and character icon information.

The Flash movie is capable of displaying visual elements, audio, text, user interface items (buttons), etc. For example, if a site provides enhancement for a Mickey Mouse character icon, the content will be provided to the service provider site in a particular manner to be understood by the Flash movie. This will also provide designers of target web sites with the flexibility of placing custom design prompts or messages anywhere on the target sites.

In the present embodiment, Practical Extraction and Reporting Language (PERL) scripts are used to provide communication between the user's character icon window 34, browser window 32 and the service provider server 16. When the user visits a target site 18, there is coding in the underlying HTML code of the target site that runs PERL scripts located at the service provider site 16. As explained above, the character icon window 34, is home to the Flash movie that displays and animates the currently-used character icon 36. Similar to the main browser window 32, the character icon window 34 communicates with the service provider server 16 by running PERL scripts that read and write data files stored on the server 16. The PERL scripts allow the browser window 32 and character icon window 34 to communicate with each other about what the user is doing, what character enhancements the user has acquired, and those that are available. The use of PERL scripts and data files avoids the security limitations that exist in web browsers. PERL is a useful tool since it is efficient and well supported.

Although the use of PERL scripts to provide communication between the browser window 34 and character icon window 32 is presently preferred, other alternatives will be apparent to those having ordinary skill in the art without departing from the scope of the present invention. For example, the use of PERL and data files can be replaced by a Disk and Execution Monitor (DAEMON) user/server setup. A DAEMON is an Internet-based server that monitors certain communications on a given TCP/IP port, and responds to those communications. Typically, a user application (such as a web browser, email client, ftp client, etc.) establishes a socket connection between itself and the DAEMON. The user can then communicate over that connection as long as the connection remains active, without ever reading or writing to disk. Thus, the browser window 32 and the character icon window 34 can communicate with each other by each having their own permanent socket connection to the server DAEMON, which would in turn pass information between the two windows.

The server DAEMON running at the service provider server simply accepts information requests and responds to them. A typical request might be, for example, "store new URL for user" and, the response would be to store that data and send out that data to any current service session that requires it. For example, when user A visits a target site by selecting an URL address from the site index on the browser window, since the user is, at that time, using the service and is in communication with the service provider server, there is code in the selected target site to send the target site address to the server 16. The DAEMON receives that message, stores the data, and sends out a message to the character icon window informing it of the user's new location.

As for interaction between multiple users, such as in icon character trading or battling, as discussed above, the DAEMON will need to be able to synchronize requests from two or more service sessions. If the request to the DAEMON from a user is "Initiate Battle with User B" then the DAEMON will send a message to user B's session informing user B that 10(user A has requested a battle. Since the DAEMON is a server program that is always running, there is a constant messaging channel (socket connection) with a user on which it can then send and receive messages. Any of these multi-session features (chat, trade, battle, display, etc.) are implemented in this fashion. Although presently more difficult to implement than PERL scripts the use of a DAEMON connection alleviates problems associated with PERL scripts, such as firewalls that perform network address translation, and proxies at ISPs that assign different users the same IP address, etc.

Unique Internet-based revenue can be generated by participating web sites which become licensed or affiliated with or subscribers of the service provider. Such participating web sites will offer enhancements, updates, rewards or special offers to visiting users. This feature yields a desirable increase in traffic to particular target web sites where such enhancements will be available. As such, the system 10 can operate or function as a source of entertainment similar to a scavenger or treasure hunt where users are encouraged to repeatedly "visit" particular target web sites to locate enhancements, etc. As discussed above, the enhancements may include, for example, access to a joke, story, clue to a mystery, a special power, e.g., a dance, song, to allow access of a character icon user to a particular Internet location or for some other purpose, or may be a prize or reward offered to a limited number of users who access the enhancement or who answer a question posed to users at a target site. Repeated user visitors to a particular target site may also have preferential access to certain enhancements.

The service provider site will be able to meter usage of users of the system to ascertain the particular target sites visited, the traffic at such sites, the amount of time spend by users at such sites, etc., and may generate a fee based service depending on the results of such monitoring. For example, target sites that have an increase in hits may be required to pay a higher subscriber fee for the service provider service, etc. The service provider will also be able to monitor the use of various purchase-incentive enhancements (e.g., electronic coupons) and obtain, as payment for providing a service, a percentage of the purchase price of goods/services purchased with the enhancement.

In a preferred embodiment, the enhancements may be tailored or made to be associated with a particular group of character icons such as a visual prop or audible sound byte associated with a character icon. Thus, for example, a visual enhancement resembling a "magic wand" may be available to a character icon resembling a wizard but not to a character icon resembling a mouse, and an enhancement resembling a piece of cheese may be available to a character icon mouse but not to a wizard icon, etc.

The availability of tailored or associated enhancements also allows for quality control standards to be established to govern the types of enhancements that will be available to a corresponding character icon. As explained above, certain trademarked and/or copyrighted characters may be available for use as a character icon through licensing with the trademark or copyright owners, e.g., The Walt Disney Company licensing Disney characters such as Mickey Mouse. On a web site operated by or with the authority of Disney, enhancements or rewards tailored to the Mickey Mouse character could be available, such as clothing, accessories or sound bytes represented in a voice associated with the Mickey Mouse character. Once acquired, the enhancement could become a permanent or temporary attribute of the particular user's Mickey Mouse character icon and will allow a user to collect numerous enhancements for a character icon and select which enhancements to display at any given time.

In the event the enhancements comprise different types of clothing accessories or articles, a system user can select, from a group of acquired clothing enhancements, which of the enhancements to display or "wear" and will allow for substitution at the desire of the user. Moreover, as some of the accumulated enhancements are designated or intended only for use with a particular icon (e.g. Mickey Mouse), it will not be useable with or accessible to other character icons. It should be appreciated that character icon representation need not be limited to fictitious or cartoon characters but may also include representations of inanimate objects and persons such as sports, music or movie celebrities or caricatures thereof.

In another preferred embodiment, the enhancements may be established and made available in categories or groupings simulating character icon hierarchy. For example, a particular enhancement or reward will not be available to a particular user until that user first acquires other enhancements. Thus, a user may have to engage in a test of skill or knowledge to determine, locate and acquire enhancements in a particular order. The target web sites offering the enhancements or rewards may, in turn, benefit in the form of increased and repeated traffic from the users, and the ability to market special offers through the use of offered enhancements.

Figure 3A:
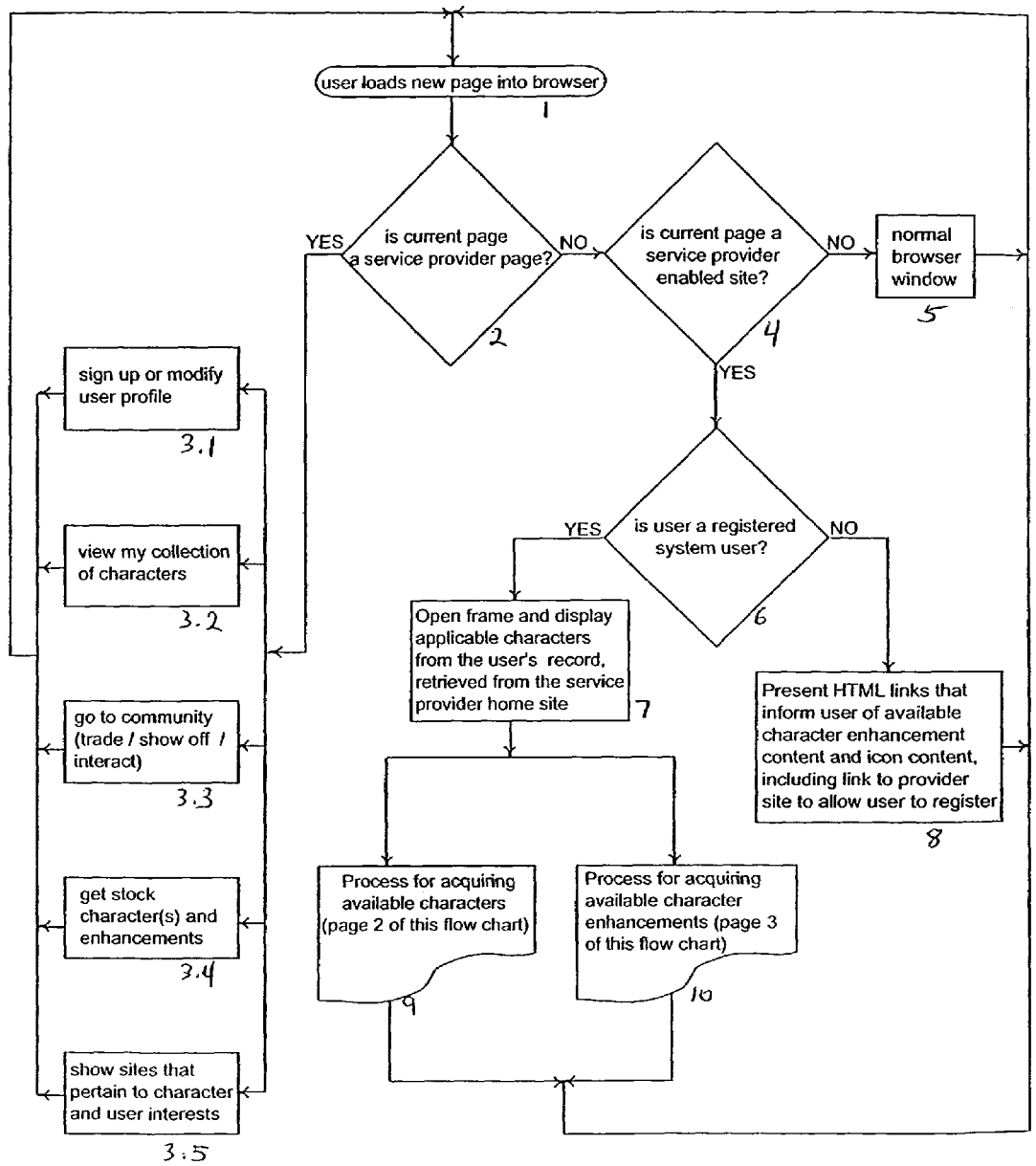
FIGS. 3a–3c are flow charts illustrating a presently preferred method of the present invention.
Figure 3B:
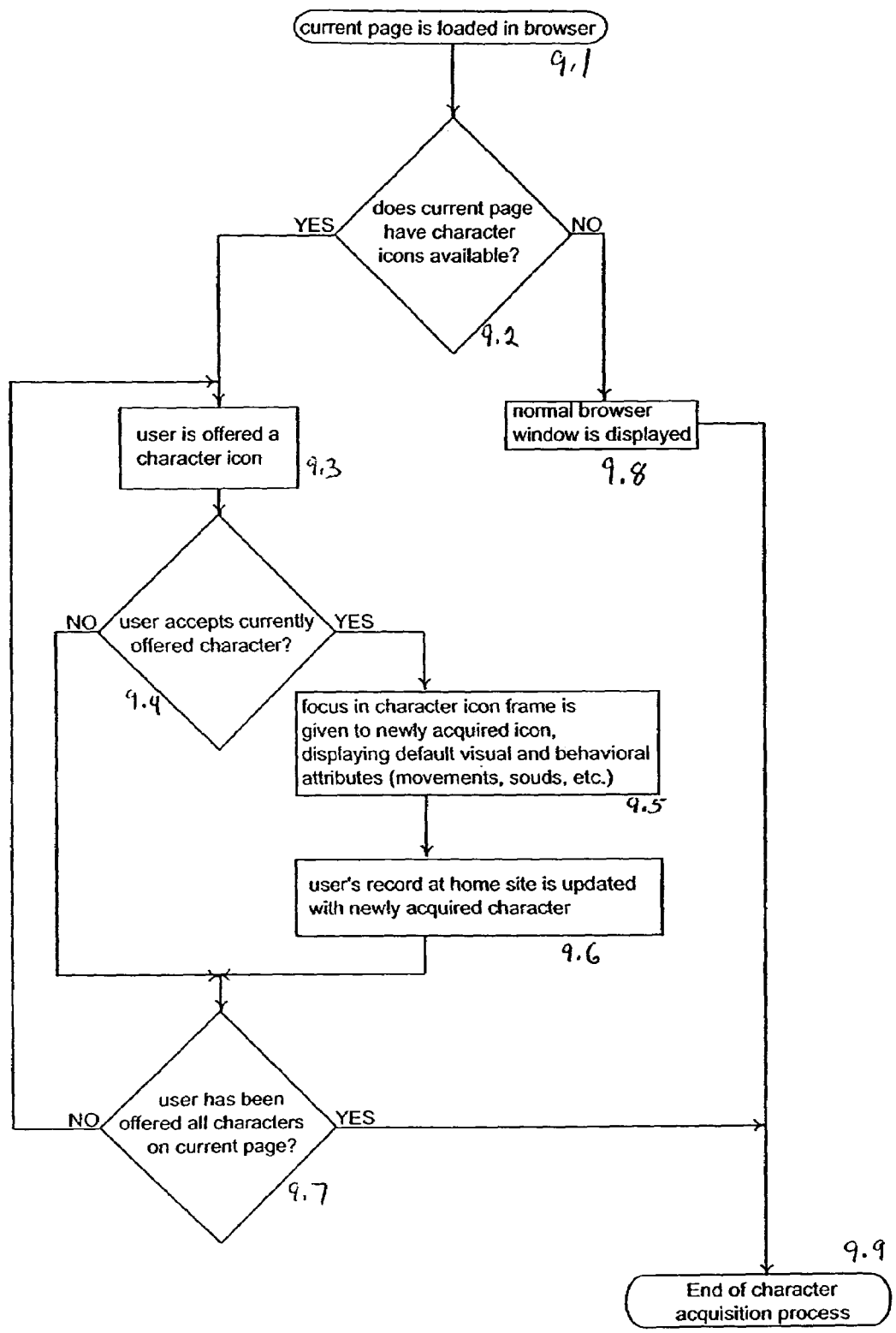
Figure 3C:
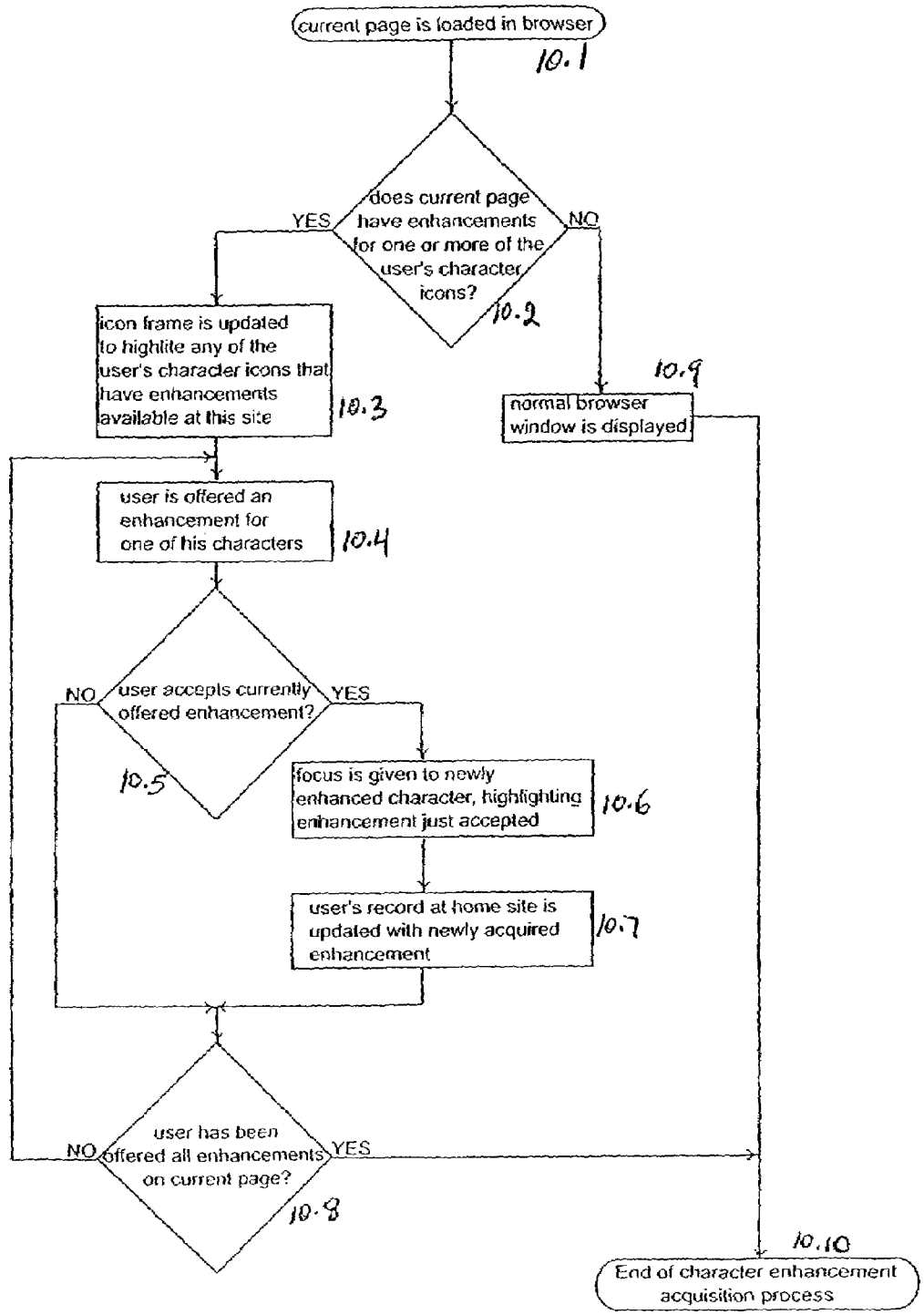

Turning now to FIGS. 3a–3c, a more detailed operation of the inventive system will now be described. Once an Internet user accesses the Internet, the user will load a particular page into the Internet browser (step 1). The system will then determine whether the loaded page is the service provider home page (step 2). If the page is the provider home page, user registration or access is provided by performing steps 3.1 through 3.5. In particular, once access is provided, the user may modify its profile, view a list of acquired character icons, go to various community sites, obtain additional character icons or enhancements offered from the home page, or show a list or index of preferred sites that the user may be interested in accessing.

If the response to the query in step 2 is "no", the system will then determine whether the currently displayed page is a provider-enabled site (step 4). If it is not, the system will display a standard normal browser window or "home page" of the user's Internet accessing device, i.e. the home page on a user's Internet browser. If the response to the query in step 4 is "yes", the system will query whether the user is a registered user (step 6). If so, the user's record is accessed from the provider home site and the characters and enhancements encoded in the record are displayed on the user's Internet device (step 7). The user can then commence a process for acquiring available characters (step 9 described in FIG. 3b) or engage in a process for acquiring available character enhancements (step 10 described in FIG. 3c). If the user is not a registered user, the user will be presented with links to inform the user of available provider content, including a link to the provider home site, to allow the user to commence the registration process if desired (step 8).

Turning now to FIG. 3b, the sub-steps to step 9 for acquiring available character icons will now be described. The system will first query whether the current displayed page on the user's browser has available characters (step 9.2). This step may include the ability for a user to view all available characters and associated enhancements so that the user can select a desired character icon from a list or menu. The menu may also depict and describe character icons and/or enhancements which that may not be presently available but which may be introduced in the future, or which may be available once the user reaches a particular "level" or becomes otherwise qualified. If characters are available, the user is offered all or select ones of the available characters (step 9.3). For example, certain characters may only be available to certain users, such as users that have accessed the particular target web site page for a certain number of times. Such "preferred" status may be associated with particular character icons to signify that the user has qualified for or attained a certain status level. Alternatively, and as explained more fully herein, a particular user may only be provided access to a character once the character is "earned" in other manners such as by requiring the user to successfully respond to one or more trivia questions, locate a "hidden" item on the displayed page, etc. Once access to a particular character is allowed, the system will query a user as to whether it will accept the offered character (step 9.4). If the user accepts the offered character, the application codes associated with the character will be made available in the particular user record for the newly-acquired character icon (step 9.5) and the user's record for that character will be updated accordingly (step 9.6). The system will then direct the user to locate other characters on the current page (step 9.7). If all available characters have been viewed, the character acquisition process may terminate (step 9.9) or the user can continue to review the characters, if desired.

As for obtaining enhancements, it is contemplated that the displayed target pages will contain enhancements for the various characters. Some target site pages, as explained more fully herein, will contain enhancement authorization or access codes corresponding to enhancements tailored to or useable with particular characters, such as a baseball icon enhancement for a Mickey Mouse icon, a sound byte, etc. It is pointed out, as mentioned above, that certain enhancement authorization codes and/or icons will only be present or appear depending on the particular character icon presently implemented or employed by the user. Thus, when at a particular site, an enhancement access icon or code may not be present until a user changes character icons by selecting a different character from the user's file contained on the service provider server.

The acquisition of the enhancements is depicted in FIG. 3c in the sub-steps of step 10. Specifically, once a current target page is loaded by a user's browser program (step 10.1), the system 10 will query as to whether the current page contains enhancement authorization codes for the then-implemented character icon (step 10.2). If enhancements are available, the user's character icon window 34 is updated to highlight the user's character and any corresponding enhancements (step 10.3). The user is then provided with an opportunity to "earn" or access the enhancements. Some of the enhancements may be available to all corresponding characters, while others must be "earned", again, by requiring a user to respond successfully to trivia questions, etc. (step 10.4). Once the user is offered the particular enhancement, such as by providing the ability to access an enhancement authorization code which may be visible in the form of an enhancement icon, or invisible but discoverable on the target page by the user, e.g. by answering a trivia question, clicking at a location on the displayed target site page, moving a cursor, etc., the user may select the enhancement authorization code (step 10.5). Focus is then given to the newly enhanced character for highlighting the accepted enhancement (step 10.6) and the user's icon record at the home site is updated with the newly acquired enhancement information (step 10.7). If additional enhancements are available at the presently accessed site, the system will allow the user to return to step 10.4 to select or earn or acquire such additional available enhancements (step 10.8). If the response to the query in step 10.2 is "no", a normal browser window will be displayed (step 10.9) and the character enhancement acquisition process will end (step 10.10).

The system will also provide functionality for creating a condensed or easily readable file containing a depiction of a particular character icon along with the enhancements or statistics associated with that character. Such a file can be presented, as is known by those having ordinary skill in the art, in the form of a virtual trading card which will list or depict, for example in icon form, the enhancements associated with the character icon as well as other information such as the "age" of the character icon, etc. The trading card file is preferably transferable via E-mail transmission and can be printed to resemble an actual trading card.

In yet another embodiment, the enhancements may be in the form of a downloadable applet or other small program which would provide other types of enhancement functionality such as security features, or the ability of a character icon to perform a specific task or function. For example, an enhancement applet may provide for use of voice recognition to verify a particular user for a character icon before operation of that character is possible.

In another embodiment, the software code or "file" associated with each character, and which also contains the various character icon enhancements acquired for that character icon, may be presented in a downloadable format for portability, such as for storage and operation on a hand-held device or for storage on a cartridge for use in a hand-held device such as a game, PDA, mobile telephone or entertainment device having wired or wireless Internet accessibility.

Although the fundamental novel features of the invention as applied to the preferred embodiment have been shown, described and pointed out herein, it will be understood that various omissions and substitutions and changes in the form and details of the method illustrated, and in its operation, may be made by those skilled in the art without departing from the spirit of the invention. For example, aside from the various enhancement features listed above, certain enhancements may also contain an embedded time limitation such that the enhancements will only operate after a certain time, or will not operate after a certain time, e.g. 30 days after it is acquired by a user. Also, certain enhancements may restrict the number of times the enhancement can be operated by a user. It is expressly intended that all combinations of those method steps which perform substantially the same function in substantially the same way to achieve the same results are within the scope of the invention. Moreover, it should be recognized that structures and/or elements shown and/or method steps described in connection with any disclosed form or embodiment of the invention may be incorporated in any other disclosed or described or suggested form or embodiment as a general matter of design choice.

What is claimed is:

1. A system comprising:
   a user device having a processor and comprising:
   a browser program capable of being run on said processor for viewing website pages;
   a graphical user interface (GUI) application capable of being run on said processor, containing a proprietary communication protocol and providing a GUI for depicting a character icon; and
   a unique identifier for identifying the user of the user device;
   a service provider for maintaining a user record corresponding to said user, for communicating with said GUI application by means of said proprietary communication protocol, for authorizing the GUI application to depict the character icon, and for providing one or more previously enabled character enhancements for the user's character icon depicted in the authorized GUI application, wherein said user record comprises identification of the user's character icon, predetermined user preferences, and the one or more previously enabled character enhancements; and a target website for offering a new character enhancement for the user's character icon, wherein the new character enhancement is capable of being enabled in the user's record at the service provider without requiring user interaction with the service provider, and wherein the character enhancements are obtained per predefined authorization rules from the service provider and/or the target website in addition to the predetermined user references; and wherein, when the user visits the target website using the browser program, the target website uses the unique identifier on the user device to access the user's record at the service provider without requiring user interaction with the service provider, whereby any new character enhancement offered to the user is appropriate for the user's character icon.

2. The system of claim 1, wherein the unique identifier comprises a cookie.

3. The system of claim 1, wherein the previously enabled character enhancement operates from cache memory in the user device.

4. The system of claim 1, wherein the new character enhancement operates from cache memory in the user device.

5. The system of claim 1, wherein the new character enhancement and the previously enabled character enhancement comprise applet programs.

6. The system of claim 1, wherein the new character enhancement and the previously enabled character enhancement comprise one of abilities, traits and equipment.

7. The system of claim 1, wherein the service provider provides an Internet location where the user can display the character icon to another user and view a character icon from the other user.

8. The system of claim 1, wherein the service provider includes means for allowing the user to trade a previously-acquired character enhancement to another user in communication with the service provider.

9. A method for viewing content over the Internet, comprising the steps of:

providing a user device having a processor, said user device having a browser program capable of being run on said processor for viewing website pages;

activating a graphical user interface (GUI) application on a user device having a browser program capable of being run on a user device processor for viewing website pages on the user device, said GUI application containing a proprietary communication protocol, a unique identifier for identifying the user of the user device, and providing a GUI for depicting a character icon on the user device;

communicating between the user device and a service provider, said service provider maintaining a user record corresponding to said user, for communicating with said GUI application by means of said proprietary communication protocol, for authorizing the GUI application to depict the character icon, and for providing one or more previously enabled character enhancements for the user's character icon depicted in the authorized GUI application, wherein said user record comprises identification of the user's character icon, predetermined user preferences, and the one or more previously enabled character enhancements;

communicating between the user device and a target website to locate a new character enhancement for the user's character icon;

communicating between a target website and said service provider for offering a new character enhancement for the user's character icon, wherein the new character enhancement is capable of being enabled in the user's record at the service provider without requiring user interaction with the service provider, and wherein the character enhancements are obtained per predefined authorization rules from the service provider and/or the target website in addition to the predetermined user references; and wherein the target website uses the unique identifier to access the user's record at the service provider without requiring user interaction with the service provider, whereby any new character enhancement offered to the user is appropriate for the user's character icon.

10. The method of claim 9, wherein the unique identifier comprises a cookie.

11. The method of claim 9, wherein the previously enabled character enhancement operates from cache memory in the user device.

12. The method of claim 9, wherein the new character enhancement operates from cache memory in the user device.

13. The method of claim 9, wherein the new character enhancement and the previously enabled character enhancement comprise applet programs.

14. The method of claim 9, wherein the new character enhancement and the previously enabled character enhancement comprise one of abilities, traits and equipment.

15. The method of claim 9, further comprising the step of providing the user with an Internet location where the user can display the character icon to another user and view a character icon from the other user.

16. The method of claim 9, further comprising the step of allowing the user to trade a previously-acquired character enhancement to another user in communication with the service provider.

* * * * *